US012732851B2

(12) United States Patent
Deng et al.

(10) Patent No.: US 12,732,851 B2
(45) Date of Patent: Sep. 8, 2026

(54) METHOD FOR PROCESSING MEASUREMENT GAP AND RELATED PRODUCTS

(71) Applicant: SPREADTRUM COMMUNICATIONS (SHANGHAI) CO., LTD., Shanghai (CN)

(72) Inventors: Yun Deng, Shanghai (CN); Miao Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 301 days.

(21) Appl. No.: 18/552,961

(22) PCT Filed: Mar. 11, 2022

(86) PCT No.: PCT/CN2022/080385
§ 371 (c)(1),
(2) Date: Sep. 28, 2023

(87) PCT Pub. No.: WO2022/206341
PCT Pub. Date: Oct. 6, 2022

(65) Prior Publication Data
US 2024/0187910 A1 Jun. 6, 2024

(30) Foreign Application Priority Data
Mar. 31, 2021 (CN) ......................... 202110354234.6

(51) Int. Cl.
*H04W 8/22* (2009.01)
*H04W 24/10* (2009.01)
(Continued)

(52) U.S. Cl.
CPC ............ *H04W 24/10* (2013.01); *H04W 8/22* (2013.01); *H04W 36/0069* (2018.08);
(Continued)

(58) Field of Classification Search
CPC ......... H04B 17/0082–3913; H04L 5/00–0098; H04W 8/22–245; H04W 24/02–10;
(Continued)

(56) References Cited

U.S. PATENT DOCUMENTS

2015/0327054 A1* 11/2015 Callender ............ H04W 24/10
2016/0192291 A1* 6/2016 Dalsgaard ............ H04W 24/10
(Continued)

FOREIGN PATENT DOCUMENTS

CN 109246846 A 1/2019
CN 110035443 A 7/2019
(Continued)

OTHER PUBLICATIONS

WIPO, International Search Report and Written Opinion for International Application No. PCT/CN2022/080385, May 26, 2022.
(Continued)

*Primary Examiner* — Timothy J Weidner
(74) *Attorney, Agent, or Firm* — JCIPRNET

(57) ABSTRACT

A method for processing measurement gap and related products are provided. The method includes the following. A user equipment (UE) receives a gap parameter configured by a network device and performs measurement by using a gap. The UE receives first control signaling, reserves a gap configuration, and suspends the gap, where the first control signaling indicates secondary cell group (SCG) deactivation or secondary cell (SCell) deactivation to the UE.

14 Claims, 5 Drawing Sheets

(51) Int. Cl.

| | |
|---|---|
| ***H04W 36/00*** | (2009.01) |
| ***H04W 76/15*** | (2018.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ............ *H04W 76/15* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 28/02–26; H04W 36/0005–385; H04W 72/02–569; H04W 76/10–50; H04W 80/02–12; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2018/0212743 | A1 | 7/2018 | Dinan | |
| 2021/0051672 | A1 | 2/2021 | Rastegardoost et al. | |
| 2024/0073982 | A1* | 2/2024 | Wallentin | H04W 24/10 |

FOREIGN PATENT DOCUMENTS

| | | | |
|---|---|---|---|
| CN | 110381530 | A | 10/2019 |
| CN | 110740050 | A | 1/2020 |
| CN | 111225396 | A | 6/2020 |
| CN | 111565412 | A | 8/2020 |
| CN | 112534858 | A | 3/2021 |
| WO | 2021026906 | A1 | 2/2021 |

OTHER PUBLICATIONS

Spreadtrum Communications (Shanghai) Co., Ltd., First Office Action issued in corresponding CN application No. 202110354234.6 dated Mar. 29, 2024, 13 pgs.

Spreadtrum Communications (Shanghai) Co., Ltd., Notification of grant of patent right for invention issued in corresponding CN application No. 202110354234.6 dated Apr. 1, 2025, 8 pgs.

Spreadtrum Communications (Shanghai) Co., Ltd., Notification of grant of patent right for invention issued in corresponding CN application No. 202210860654.6 dated Jan. 3, 2025, 8 pgs.

Spreadtrum Communications (Shanghai) Co., Ltd., PCT/CN2022/080385, International Preliminary Report on Patentability dated Oct. 3, 2023, 5 pgs.

* cited by examiner

METHOD FOR PROCESSING MEASUREMENT GAP AND RELATED PRODUCTS

CROSS-REFERENCE TO RELATED DISCLOSURE(S)

The application is a National Stage of International Application No. PCT/CN2022/080385, field Mar. 11, 2022, which claims priority to Chinese Patent Application No. 202110354234.6, filed Mar. 31, 2021, the entire disclosure of which are incorporated herein by reference.

TECHNICAL FIELD

The disclosure relates to the field of communication processing technologies, and in particular to a method for processing a measurement gap and related products.

BACKGROUND

In dual connectivity (DC) of long term evolution (LTE) and new radio (NR), if a measurement gap or a Per-UE gap for a frequency range 1 (FR1) needs to be configured, measurement requirement of a secondary base station for an inter-frequency needs to be considered, when a LTE base station serves as a master base station for a user equipment (UE). During a gap, the UE interrupts communication of a serving cell, therefore measurement of the inter-frequency by using the gap may cause an unnecessary interruption of a service, and affect network transmission rate. After a deactivation function of a secondary cell group (SCG) is introduced into the DC, how to reasonably process a gap configured by a network is a problem requiring urgent processing, and it is necessary to avoid large signaling overhead caused by frequently reconfiguring the gap.

SUMMARY

In a first aspect, a method for processing a measurement gap is provided. The method is applied to a user equipment (UE) and includes the following. The UE receives a gap parameter configured by a network device and performs measurement by using a gap. The UE receives first control signaling, reserves a gap configuration, and suspends the gap, where the first control signaling indicates secondary cell group (SCG) deactivation or secondary cell (SCell) deactivation to the UE.

In a second aspect, an electronic device is provided. The electronic device includes a processor, a memory, a communication interface, and one or more programs stored in the memory and configured to be executed by the processor. The programs include instructions for executing operations of the method described in the first aspect or the second aspect.

In a third aspect, a non-transitory computer-readable storage medium is provided. The computer-readable storage medium stores computer programs for electronic data interchange (EDI), where the computer program enables the computer to implement the method described in the first aspect or the second aspect.

BRIEF DESCRIPTION OF THE DRAWINGS

Accompanying drawings used for describing embodiments of the present disclosure are introduced below.

DETAILED DESCRIPTION

Embodiments of the present disclosure will be described hereinafter in connection with accompanying drawings in embodiments of the present disclosure.

The term "and/or" in the disclosure is simply an illustration of an association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

The term "multiple" in the embodiments of the present disclosure refers to two or more. The expressions such as "the first" and "the second" in the embodiments of the present disclosure are only for illustrative purposes and to distinguish the description objects, without distinction in order, nor do they represent a special limit on the number of devices in the embodiments of the present disclosure, and cannot constitute any restriction on the embodiments of the present disclosure. The term "connection" in the embodiments of the present disclosure refers to various connection modes, such as direct connection or indirect connection, to implement communication between devices, and the embodiments of the present disclosure do not impose any limitation in this regard.

Figure 1:
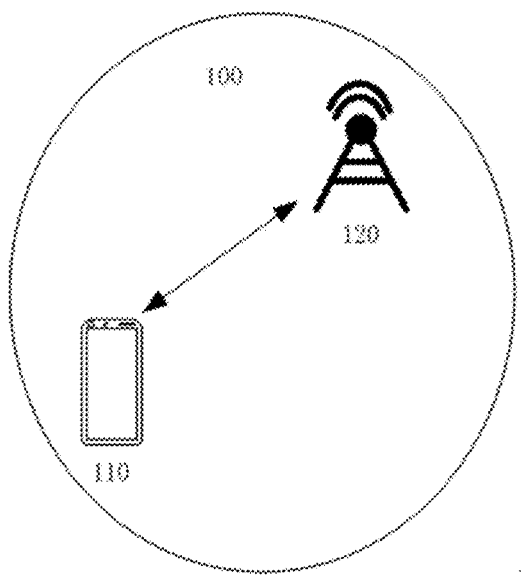
FIG. 1 is a schematic architectural diagram of a communication system.

Technical solutions of embodiments of the present disclosure are applicable to an exemplary communication system 100 as illustrated in FIG. 1. The exemplary communication system 100 includes a terminal 110 and a network device 120, where terminal 110 is in communication connection with the network device 120.

The terminals in the embodiments of the disclosure may be various UEs, access terminals, subscriber units, subscriber stations, mobile stations (MS), remote stations, remote terminals, mobile devices, user terminals, terminal equipment, wireless communication devices, user agents, or user devices. The terminal equipment may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a future 5G network, or a terminal equipment in a future evolved public land mobile network (PLMN), etc. The embodiments of the present disclosure do not impose any limitations in this regard.

Figure 2:
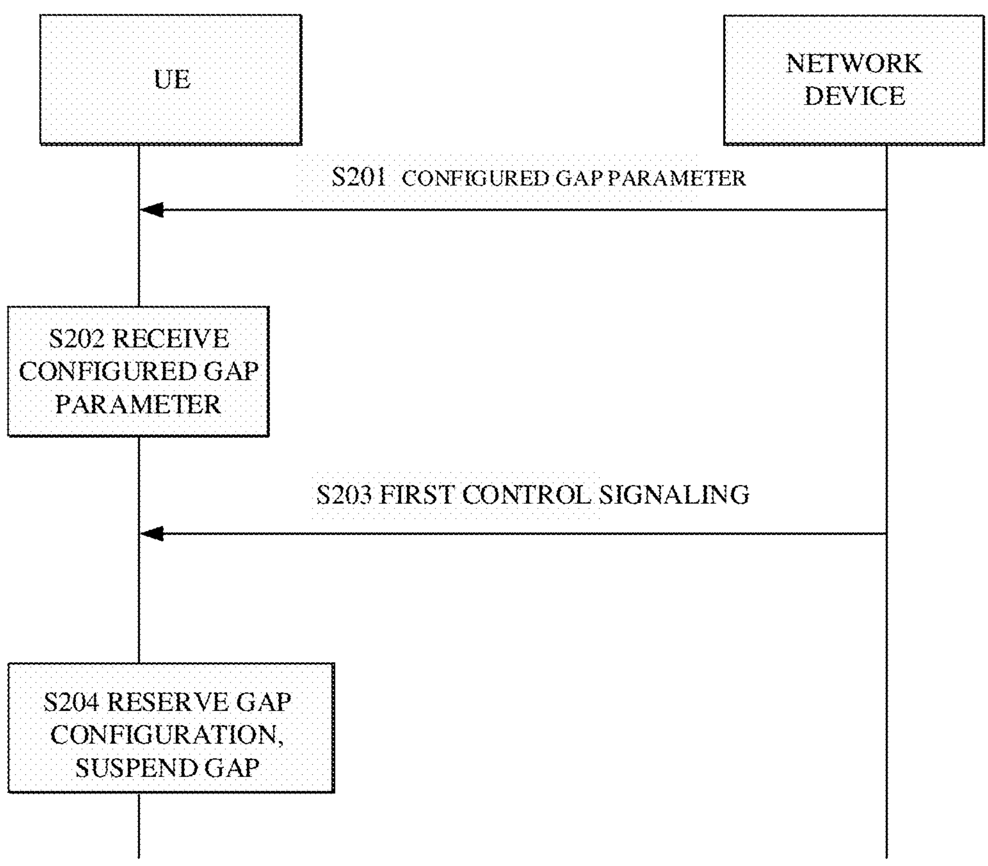
FIG. 2 is a schematic flow diagram of a method for processing a measurement gap provided in the disclosure.

Referring to FIG. 2, FIG. 2 provides a method for processing a measurement gap. The method can be executed under a network architecture as illustrated in FIG. 1. As illustrated in FIG. 2, the method includes the following.

At S201, a network device sends a configured gap parameter to a UE.

The gap parameter includes, but is not limited to, one or any combination of period of a gap, type of the gap, a start time of the gap in the period, and duration of the gap.

At S202, the UE receives the gap parameter sent by the network device.

At S203, the network device sends first control signaling to the UE, where the first control signaling indicates secondary cell group (SCG) deactivation or secondary cell (SCell) deactivation to the UE.

At S204, the UE receives the first control signaling, reserves a gap configuration, and suspends the gap, where the first control signaling indicates SCG deactivation or SCell deactivation to the UE.

Optionally, the first control signaling includes, but is not limited to, a medium access control (MAC) control element (CE) or layer 1 signaling.

In the above embodiments, the combination of operations at S202 and S204 can be a method for processing the measurement gap at the UE side, and the combination of operations at S201 and S203 can be a method for processing the measurement gap at the network device side.

In technical solutions provided in the present disclosure, the UE receives the gap parameter configured by the network device, performs measurement by using the gap, receives the first control signaling, reserves the gap configuration, and suspends the gap, where the first control signaling indicates SCG deactivation or SCell deactivation to the UE. Because the UE suspends the gap, network data will not be interrupted, and network transmission rate is improved, thereby improving network performance.

Exemplarily, in an optional solution, the UE adjusts frequencies to be measured according to the first control signaling, specifically includes the following. The UE stops measuring measurement frequencies configured by a secondary base station during SCG deactivation. Alternatively, the UE continues measuring part of the measurement frequencies configured by the secondary base station during SCG deactivation. Alternatively, the UE continues measuring all the measurement frequencies configured by the secondary base station during SCG deactivation.

Exemplarily, in an optional solution, the method further includes the following. The UE receives second control signaling, starts the gap according to the gap parameter, and performs measurement. The second control signaling indicates SCG activation to the UE.

The second control signaling can be a MAC CE or layer 1 signaling.

Exemplarily, in an optional solution, the method further includes the following. The UE is configured with a dual connectivity (DC) which is evolved-universal terrestrial radio access network-new radio (EN)-DC, new radio-evolved universal terrestrial radio access network (NE)-DC, new radio (NR)-DC, or other forms used in practice. The UE determines SCG deactivation according to the first control signaling. If a radio frequency (RF) transceiver serving a SCG is different from an RF transceiver serving a master cell group (MCG), the UE suspends the measurement gap; or if the UE indicates that the gap is not required for the measurement in a NeedForGAP message reported when the SCG is not configured, the UE suspends the measurement gap.

Exemplarily, the dual connectivity described above include, but are not limited to, NE-DC, NR-DC, next generation radio access network evolved universal terrestrial radio access network-new radio (NGEN)-DC, or multi-radio (MR)-DC.

Exemplarily, in an optional solution, the method further includes the following. The UE receives the second control signaling, starts the gap according to the gap parameter, and performs measurement. The second control signaling indicates SCG activation to the UE.

Exemplarily, in an optional solution, when the UE is configured with a carrier aggregation (CA) and determines SCell deactivation according to the first control signaling, if an RF transceiver serving a deactivated SCell is different from an RF transceiver serving other serving cells or if the UE indicates that the gap is not required for the measurement in a NeedForGAP message reported when the deactivated SCell is not configured, the UE suspends the measurement gap.

Exemplarily, in an optional solution, the method further includes the following. The UE receives the second control signaling, starts the gap according to the gap parameter, and performs measurement. The second control signaling indicates SCell activation to the UE.

Deactivating the SCell can refers to deactivating one or more SCells, and activating the SCell also refers to activating one or more SCells herein.

Figure 3:
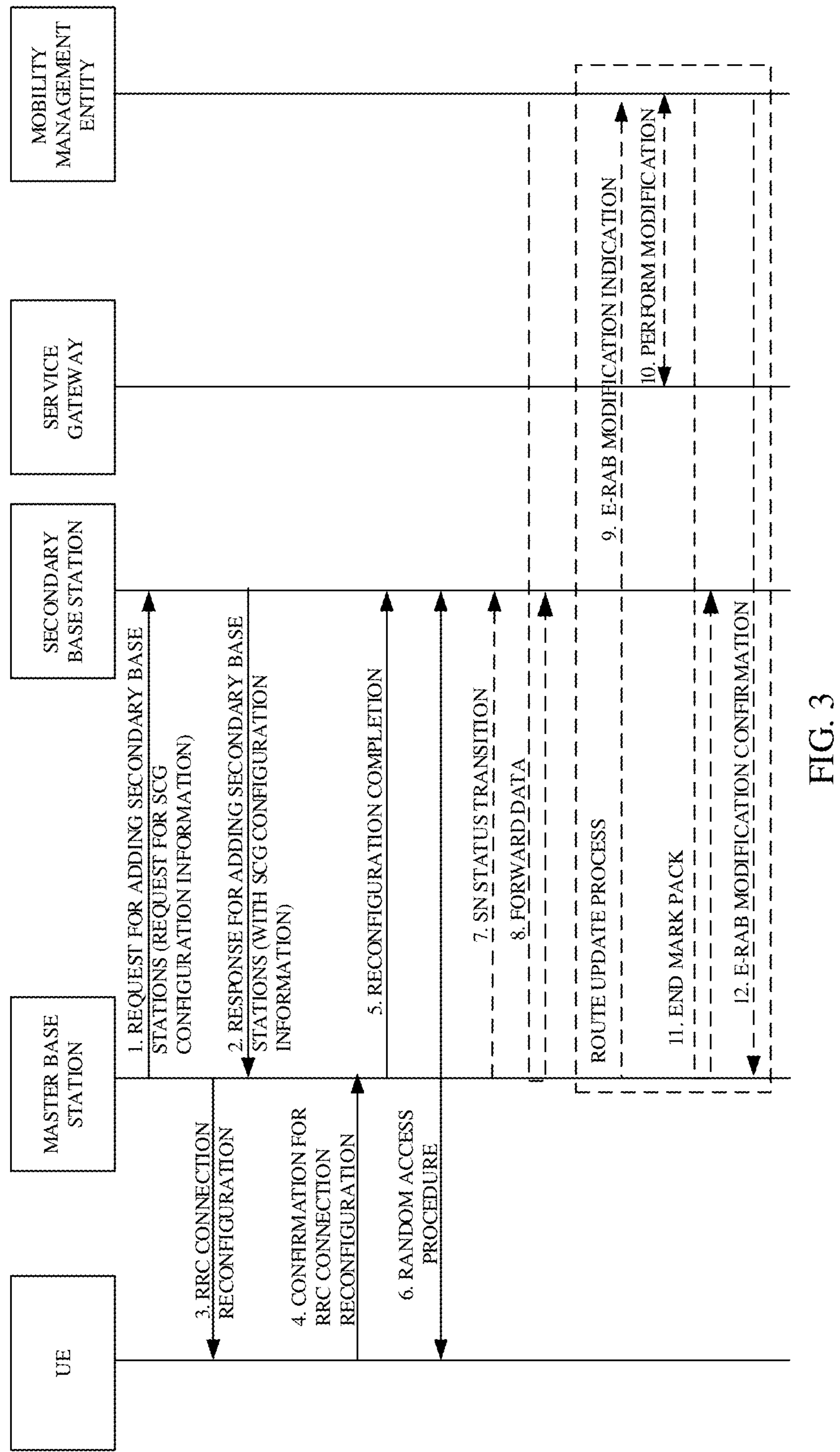
FIG. 3 is a schematic flow diagram of a dual connection provided in the disclosure.

Referring to FIG. 3, FIG. 3 provides a process of establishing EN-DC. As illustrated in FIG. 3, the process can specifically include the following.

1. A master base station (hereinafter refer to as a master station) determines to request a secondary base station (hereinafter refer to as a secondary station) to allocate resources for an evolved universal terrestrial radio access network (E-UTRAN) radio access bearer (E-RAB), and indicates E-RAB features.

The above E-RAB features can specifically include E-RAB parameters and transport network layer (TNL) address information corresponding to bearer type.

SCG configuration information, that the master station indicates to request, includes complete UE capability and negotiation result of the UE capability. The master station provides the latest measurement result so that the secondary station selects SCG cells. The master station can request the secondary station to allocate resources for MCG split signaling radio bearer (SRB), and the secondary station determines whether to establish a SRB3. Exemplarily, the master station provides TNL address and maximum quality of service (QoS) level that can be supported, for the SCG split bearer.

Taking MCG split bearer as an example, the master station can request a certain amount of resources from the secondary station, only total resources allocated by two base stations are needed to satisfy QoS requirement, and QoS parameters indicated by the master station to the secondary station can be inconsistent with parameters received by a S1 interface. For a certain E-RAB, the master station can directly request the secondary station to establish SCG bearer or MCG/SCG split bearer, and it is unnecessary to establish MCG bearer first.

2. If a secondary gNodeB (SgNB) accepts the request, the SgNB allocates radio resources, and allocates transmission network resources for some bearers.

The SgNB determines to configure a primary secondary cell (PSCell) and other SCG cells for a UE, and determines to indicate radio resource configuration of the SCG to the master base station through a secondary base station request containing NR radio resource control (RRC) configuration information. For the SCG bearer and the SCG split bearer, the SgNB further needs to indicate a security algorithm and S1 downlink (DL) TNL address information. Taking the split bearer as an example, the TNL address information for data transmission also needs to be transmitted between the base stations. For the SCG split bearer, the secondary station can request a certain amount of radio resources from the master station, and only total resources allocated by two base stations are needed to satisfy the QoS requirement.

3. The master station sends a RRC connection reconfiguration to the UE, where the RRC connection reconfiguration contains unmodified NR RRC configuration information.
4. The UE uses the configuration, and returns a confirmation for the RRC connection reconfiguration to the master station. The confirmation for the RRC connection reconfiguration contains an NR RRC response. If the UE cannot use the configuration, the UE performs a reconfiguration failure process.
5. The master station sends a SgNB reconfiguration completion containing the NR RRC response, to the secondary station.
6. The UE is synchronized to the PSCell, and initiates a random access procedure.
7. The master station sends a SN status transition to the secondary station.
8. The master station sends forward data to the secondary station.

9-12. The master station triggers a core network to perform path switching.

Embodiment 1

Figure 4:
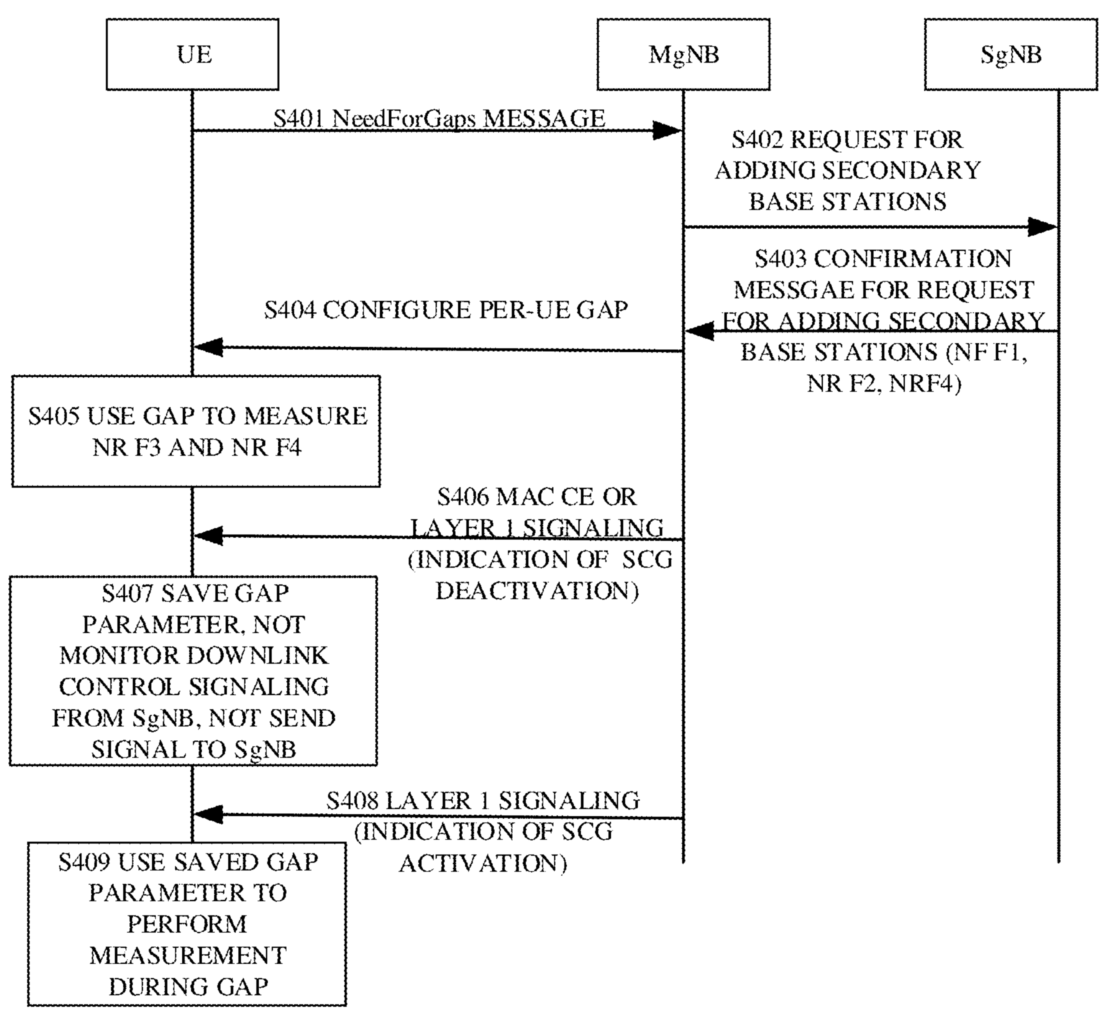
FIG. 4 is a schematic flow diagram of a method for processing a measurement gap provided in a first embodiment of the disclosure.

A first embodiment of the present disclosure provides a method for processing a measurement gap. A UE in the embodiment of the present disclosure firstly accesses a master eNodeB (MeNB, or referred to as MN). The MeNB configures the UE to measure certain NR frequencies (NR F1, NR F2, and NR F3). It is assumed that the UE can measure NR F1, NR F2, and NR F3 without a gap, after the UE access the secondary base station and establishes a dual connection, the secondary base station needs NR frequencies (NR F1, NR F2, and NR F4) to be measured by the UE. Frequencies of serving cells at the SCG side are NR F1 and NR F2, that is, two serving cells included in SCG configuration are respectively located in NR F1 and NR F2, and NR F3 and NR F4 are inter-frequencies. As illustrated in FIG. 4, the method includes the following.

At S401, the UE reports a NeedForGaps message to the MeNB. The NeedForGaps message includes whether the UE needs the gap when measuring NR F1, NR F2, and NR F3, and it is assumed that the gap is not needed here.

At S402, the MeNB sends a request for adding secondary base stations to a secondary base station (also referred to as a secondary eNodeB (SgNB or SN).

At S403, the SgNB configures serving cells on NR F1 and NR F2 for the UE, and the SgNB needs to configure the UE to measure NR F1, NR F2, and NR F4. The SgNB sends configuration information of the SgNB to the MeNB through a confirmation message for the request for adding secondary base stations. The configuration information includes the NR frequencies to be measured by the UE (NR F1, NR F2, and NR F4).

At S404, the MeNB needs to configure a gap parameter for the UE and configures a Per-UE gap for the UE through a RRC connection reconfiguration, after the MeNB judges that the UE establishes a DC.

In this step, the MeNB may send parameters configured by the SgNB for the UE and the gap parameter configured by the MeNB for the UE together to the UE through RRC connection reconfiguration signaling.

At S405, the UE uses the gap to measure NR F3 and NR F4.

This step further includes that the UE establishes DC.

At S406, the MeNB sends an indication of SCG deactivation to the UE through a MAC CE or layer 1 signaling, after the MeNB detects that there is no data transmission between the SgNB and the UE within a period of time.

In this step, the MeNB can detect whether there is no data transmission between the UE and the SgNB with an interface between the SgNB and the MeNB, or can notify the MeNB that there is no data transmission between the UE and the SgNB through an interface between the base stations after detection of the SgNB.

At S407, after receiving the indication of SCG deactivation, the UE saves the gap parameter, does not monitor downlink control signaling from the SgNB, does not send a signal to the SgNB, and continues measuring measurement frequencies configured by the MeNB.

Because one RF transceiver, originally serving the SCG, of the UE may be temporarily idle after the SCG is deactivated, the RF transceiver may be used to measure NR F1, NR F2, NR F3, and NR F4, and the UE can suspend the gap after receiving the indication of SCG deactivation. The MeNB can know from the NeedForGaps reported by the UE in S401 that, the UE may measure some NR frequencies ranges without the gap after the SCG is deactivated. Therefore, the MeNB can perform transmission of data and the signaling with the UE in an original gap period, when the UE temporarily suspends the gap, thereby improving transmission efficiency.

Specifically, the UE can have different solutions for processing measurement frequencies configured by the SN (also known as the SgNB). The UE has no need to measure the measurement frequencies configured by the SN during SCG deactivation. Alternatively, the UE needs to measure the measurement frequencies configured by the SN during SCG deactivation. Alternatively, the UE needs to measure part of the measurement frequencies configured by the SN during SCG deactivation, such as frequencies of serving cells configured by the SN.

In this case, the MN can determine, according to measurement frequencies configured by the MN and the SN, which measurement frequencies configured by the SN are to be continuously measured by the UE, and then can notify the UE, when the MN indicates SCG deactivation to the UE. Alternatively, another manner can be adopted for a technical scenario in which the UE needs to continue measuring part of the measurement frequencies configured by the SN. As a manner pre-set by a protocol, the UE judges whether it is necessary to measure the measurement frequencies configured by the SN, selects a measurement frequency point which is not configured by the MN, such as F4, according to the measurement frequencies respectively configured by the MN and SN, and continues performing measurement on the measurement frequency point which is not configured by the MN. Since the MN has already configured relevant measurement tasks for F1 and F2, the UE measures F1 and F2 according to the measurement tasks configured by the MN, and needs to continue measuring F3 configured by the MN.

At S408, the MeNB sends an indication of SCG activation to the UE when a set condition (data transmission requirement, such as need for dual-connection transmission data to increase rate) is satisfied.

At S409, the UE uses the saved gap parameter to perform measurement during the gap after receiving the indication of SCG activation.

After receiving the indication of SCG activation, the UE restores a signaling detection and data transmission of the SCG. In this case, the UE usually needs to use one independent RF transceiver to server the SCG. For the UE having two RF transceivers, one serves the MCG, the other serves the SCG. In this case, if the UE needs to performs inter-frequency measurement or inter-system cell measurement, the UE needs to use the gap for the inter-frequency measurement or the inter-system cell measurement.

Above measurement include, but is not limited to, the inter-frequency measurement or the inter-system measurement.

In the technical solutions provided in the first embodiment of the disclosure, the MN and the UE can judge whether the UE needs the gap to measure the frequency point to be measured when the SCG is deactivated, according to the NeedForGAP message reported by the UE to the MN when the SCG is not activated. If the gap is judged to be unnecessary to measure the frequency point to be measured when the SCG is deactivated, the UE can suspend the gap, and can continue communicating with a network during the gap, when the UE is currently configured with the Per-UE gap or the FR1-GAP and after the UE receives the indication of SCG deactivation, thereby improving data transmission efficiency. The UE resumes using the gap when the network activates the SCG again. Signaling interaction can be reduced effectively, and frequent configuration, release, and reconfiguration of the gap by the network can be avoided during the process.

Embodiment 2

Figure 5:
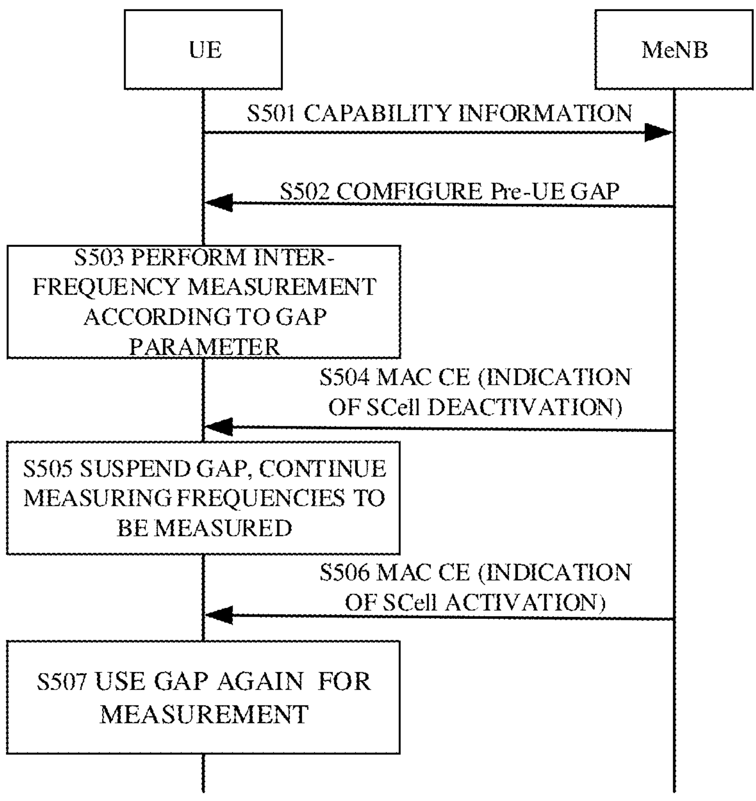
FIG. 5 is a schematic flow diagram of a method for processing a measurement gap provided in a second embodiment of the disclosure.

A second embodiment of the present disclosure provides a method for processing a measurement gap. Technical scenarios of the embodiment are as follows. Capability information of a UE can specifically include inter-band CA, such as CA of band 1 and band 2, where an interval between two bands is relatively large, the UE cannot simultaneously serve serving cells of the band 1 and the band 2 with one RF transceiver, and the UE has two RF transceivers. The UE has four activated serving cells, where a primary cell (PCell) and a secondary cell (SCell 1) are located in the band 1, and a SCell 2 and a SCell 3 are located in the band 2. The UE uses two RF transceivers to respectively serve serving cells of the band 1 and serving cells of the band 2. Refer to FIG. 5, where FIG. 5 is a schematic flow diagram of a method for processing a measurement gap provided in embodiment 2. As illustrated in FIG. 5, the method includes the following.

At S501, the UE reports the capability information to a MeNB corresponding to the PCell.

At S502, the MeNB sends a configured gap parameter to the UE.

At S503, the UE performs inter-frequency measurement and inter-system measurement according to the gap parameter.

At S504, the MeNB sends a MAC CE to the UE, when the MeNB determines that data transmission volume of the UE is not large (for example, lower than a transmission threshold value). The MAC CE contains an indication of SCell deactivation (for example, SCell 2 deactivation and SCell 3 deactivation).

At S505, the UE suspends a gap and continues measuring frequencies to be measured.

Because a base station deactivates the serving cells of the band 2, the UE has one idle RF transceiver. The UE can measure inter-frequency and inter-system cell to be measured with the RF transceiver, and can measure the inter-frequency and the inter-system cell without using the gap.

At S506, the MeNB sends a MAC CE to the UE, when the MeNB determines that the data transmission volume of the UE is relatively large (for example, higher than the transmission threshold value). The MAC CE contains an indication of activating aSCell (for example, comprising activating the SCell 2 and the SCell 3).

At S507, the UE uses the gap again for measurement after receiving the indication of SCell activation.

The UE needs to use the idle RF transceiver to serve the SCell 2 and the SCell 3 after the SCell is activated. In this case, if there is inter-frequency and inter-system to be measured, the UE needs to use the gap to perform measurement.

In the embodiment 2 of the present disclosure, the UE receives the gap parameter configured by the network device, performs measurement by using the gap, receives first control signaling, reserves the gap configuration, and suspends the gap, where the first control signaling indicates SCG deactivation or SCell deactivation to the UE. Because the UE suspends the gap, network data transmission will not be interrupted, and the network transmission rate is improved, thereby improving network performance.

Figure 6:
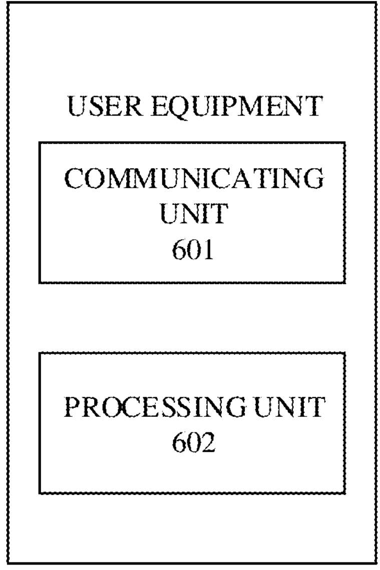
FIG. 6 is a schematic structural diagram of a user equipment provided in the disclosure.

Referring to FIG. 6, FIG. 6 provides a UE, and the UE includes a communicating unit 601 and a processing unit 602.

The communicating unit 601 is configured to receive a gap parameter configured by a network device, perform measurement by using a gap, and receive first control signaling, where the first control signaling indicates SCG deactivation or SCell deactivation to the UE.

The processing unit 602 is configured to reserve a gap configuration and suspend the gap.

The communicating unit and the processing unit in embodiments of the present disclosure may further be configured to perform optional solutions or detailed solutions performed by the UE in the embodiment illustrated in FIG. 2, which is not described herein again.

Figure 7:
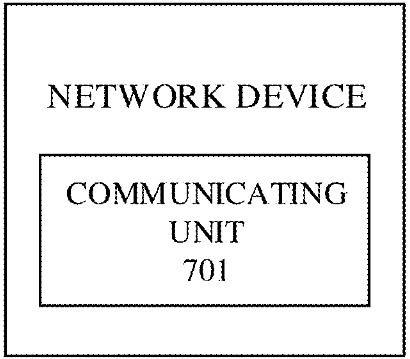
FIG. 7 is a schematic structural diagram of a network device provided in the disclosure.

Referring to FIG. 7, FIG. 7 provides a network device. The network device includes a communicating unit 701.

The communicating unit 701 is configured to send a configured gap parameter to a UE, and send first control signaling to the UE, where the first control signaling indicates SCG deactivation or SCell deactivation to the UE.

The communicating unit in embodiments of the present disclosure may further be configured to perform optional solutions or detailed solutions performed by the network device in the embodiment illustrated in FIG. 2, which is not described herein again.

It can be understood that, in order to implement the above functions, the device includes hardware and/or software modules for performing the respective functions. In combination with the algorithmic operations of various examples described in the embodiments disclosed herein, the present disclosure can be implemented in hardware or a combination of hardware and computer software. Whether a function is implemented by way of the hardware or hardware driven by the computer software depends on the particular application and design constraints of the technical solution. Those skilled in the art may use different methods to implement the described functions for each particular application in combination with the embodiments, but such embodiment should not be considered beyond the scope of the present disclosure.

According to the embodiments of the disclosure, functional modules may be divided for the electronic device in accordance with the above method examples. For example, each functional module may be divided according to each function, and two or more functions may be integrated into one processing module. The above-mentioned integrated module can be implemented in the form of hardware. It should be noted that the division of modules in the embodiments of the present disclosure is illustrative, and is merely a logical function division, and there may be other division manners in actual embodiment.

It should be noted that all related content of each operation involved in the above method of the embodiments of the present disclosure may be referred to a functional description of a corresponding functional module, which is not described herein again.

In the case of the integrated unit, the user equipment may include a processing module and a memory module, where the processing module is configured to control and manage operations of the user equipment, for example, the processing module may be configured to support an electronic device to perform operations executed by the communicating unit and processing unit. The memory module is configured to support the electronic device to perform a program code, data, and the like.

The processing module may be a processor or a controller, which may implement or perform the various illustrative logical blocks, modules, and circuits described in connection with the present disclosure. The processor may also be a combination that implements a computing function, for example, a combination of one or more microprocessors, or a combination of a digital signal processing (DSP) and a microprocessor. The memory module may be a memory. The communicating module may specifically be a device that interacts with other electronic devices, such as a RF circuit, a Bluetooth chip, or a Wi-Fi chip.

It should be understood that the interface connection relationship among the modules illustrated in the embodiments of the present disclosure is only illustrative, and does not constitute a limitation to the structure of the user equipment. In other embodiments of the present disclosure, the user equipment may also adopt different interface connection modes or a combination of multiple interface connection modes in the above embodiments.

Figure 8:
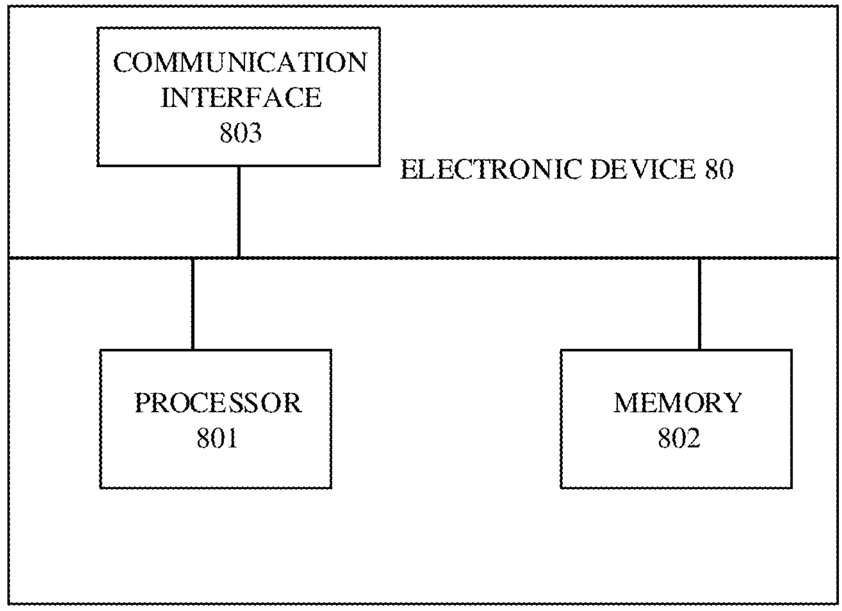
FIG. 8 is a schematic structural diagram of an electronic device provided in embodiments of the disclosure.

Referring to FIG. 8, FIG. 8 is an electronic device 80 provided in the embodiments of the present disclosure. The electronic device 80 includes a processor 801, a memory 802, and a communication interface 803. The processor 801, the memory 802, and the communication interface 803 are connected through a bus.

The memory 802 includes, but is not limited to, a random access memory (RAM), a read-only memory (ROM), an erasable programmable read-only memory (EPROM), or a compact disc read-only memory (CD-ROM), and is configured to store associated computer programs and data. The communications interface 803 is configured to receive and transmit data.

The processor 801 may be one or more central processing units (CPU). When the processor 801 is a CPU, the CPU may be a single-core CPU or a multi-core CPU.

The processor 801 may include one or more processing units, for example, the processing units may include an application processor (AP), a modem processor, a graphics processing unit (GPU), an image signal processor (ISP), a controller, a video codec, a digital signal processor (DSP), a baseband processor, and/or a neural-network processing unit (NPU). The different processing units may be independent components or integrated into one or more processors. In some embodiments, the user equipment may also include one or more processing units. The controller may generate an operation control signal based on an instruction operation code and a timing signal to complete the control of taking and executing the instruction. In other embodiments, the processing unit may also be provided with memory for storing instructions and data.

Exemplarily, the memory in the processing unit may be a cache memory to store an instruction or data that is just used or cycled by the processing unit. If the processing unit needs to use the instruction or data again, it may be invoked directly from the memory. In this way, repeated access is avoided, and the waiting time of the processing unit is reduced, thereby improving the efficiency of the user equipment in processing data or executing instructions.

In some embodiments, the processor 801 may include one or more interfaces, including an inter-integrated circuit (I2C) interface, an inter-integrated circuit sound (I2S) interface, a pulse code modulation (PCM) interface, a universal asynchronous receive/transmitter (UART) interface, a mobile industry processor interface (MIPI), a general-purpose input/output (GPIO) interface, a SIM card interface, and/or a universal serial bus (USB) interface, and the like. The USB interface is an interface complying with a USB standard specification, and may specifically be a Mini USB interface, a Micro USB interface, a USB type-C interface, or the like. The USB interface may be configured to connect a charger to charge user equipment, to transmit data between the user equipment and peripheral equipment, and to connect to an earphone through which audio is played.

If the electronic device 80 is a user equipment, for example, a smartphone, the processor 801 in the electronic device 80 is configured to read the computer program code stored in the memory 802 to perform the following operations: receiving a gap parameter configured by a network device, performing measurement by using a gap, receiving first control signaling, reserving a gap configuration, and suspending the gap, where the first control signaling indicates SCG deactivation or SCell deactivation to the UE.

All related content of each scenario involved in the above method embodiments of the present disclosure can be incorporated to the functional description of corresponding functional modules by reference, which is not described herein again.

If the electronic device 80 is a network equipment, for example, a base station, the processor 801 in the electronic device 80 is configured to read the computer program code stored in the memory 802 to perform the following operations: sending a configured gap parameter to a UE, and sending first control signaling to the UE, where the first control signaling indicates SCG deactivation or SCell deactivation to the UE.

All related content of each scenario involved in the above method embodiments of the present disclosure can be incorporated to the functional description of corresponding functional modules by reference, which is not described herein again.

A chip system is provided in the embodiments of the present disclosure. The chip system includes at least one processor, a memory, and an interface circuit. The memory, the transceiver, and at least one processor are interconnected through lines, and at least one memory is configured to store computer programs. When the computer program is executed by the processor, the operations illustrated in FIG. 2 can be realized.

A computer-readable storage medium is provided in the embodiments of the present disclosure to store the computer program. When the computer-readable storage medium runs on the network device, the operations illustrated in FIG. 2 can be realized.

A computer program product is provided in the embodiments of the present disclosure. When the computer program product runs on the terminal, the operations illustrated in FIG. 2 can be realized.

An electronic device is provided in the embodiments of the present disclosure. The electronic device includes a processor, a memory, a communication interface, and one or more programs stored in the memory and configured to be executed by the processor, where the programs include instructions for executing operations of the method of the embodiment illustrated in FIG. 2.

A network device further is provided in the embodiments of the present disclosure. The network device is configured to support the UE to execute the method and detail solutions illustrated in FIG. 2.

The above solution of the embodiments of the disclosure is mainly described from the viewpoint of the operations at method side. It can be understood that, in order to implement the above functions, the electronic device includes hardware structures and/or software modules for performing the respective functions. Those skilled in the art should readily recognize that, in combination with the units and algorithmic operations of various examples described in the embodiments disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered beyond the scope of the present disclosure.

According to the embodiments of the disclosure, functional units may be divided for the electronic device in accordance with the above method examples. For example, each functional unit may be divided according to each function, and two or more functions may be integrated into one processing unit. The above-mentioned integrated unit can be implemented in the form of hardware or software functional units. It should be noted that the division of units in the embodiments of the present disclosure is illustrative, and is merely a logical function division, and there may be other division manners in actual embodiment.

For the sake of simplicity, the above method embodiments are described as a series of action combinations. However, it will be appreciated by those skilled in the art that embodiments are not limited by the sequence of actions described. According to the disclosure, some steps or operations may be performed in other orders or simultaneously. Besides, it will be appreciated by those skilled in the art that the embodiments described in the specification are exemplary embodiments, and the actions and modules involved are not necessarily essential to the disclosure.

In the above embodiments, the description of each embodiment has its emphasis. For the parts not described in detail in one embodiment, reference may be made to related descriptions in other embodiments.

It will be appreciated that the devices disclosed in embodiments herein may also be implemented in various other manners. For example, the above device's embodiments are merely illustrative, for example, the division of units is only a division of logical functions, and there may exist other manners of division in practice; multiple units or assemblies may be combined or integrated into another system, or some features may be ignored or skipped. In other respects, the coupling or direct coupling or communication connection as illustrated or discussed may be an indirect coupling or communication connection through some interface, device or unit, and may be electrical or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in embodiments herein may be integrated into one processing unit or may be present as a number of physically separated units, and two or more units may be integrated into one. The integrated unit may take the form of a hardware or a software functional unit.

If the integrated units are implemented as software functional units and sold or used as standalone products, they may be stored in a computer-readable memory. Based on such an understanding, the essential technical solution, or the portion that contributes to the prior art, or all or part of the technical solution of the disclosure may be embodied as software products. The computer software products can be stored in a memory and may include multiple instructions that, when executed, can cause a computing device, for example, a personal computer, a server, a network device, etc., or a processor to execute some or all operations of the methods described in various embodiments. The above memory may include various kinds of medium that can store program codes, such as a USB flash disk, a mobile hard drive, a ROM, a RAM, a magnetic disk, or an optical disk.

It will be understood by those of ordinary skill in the art that all or a part of the various methods of the embodiments described above may be accomplished by means of a program to instruct associated hardware, and the program may be stored in a computer-readable memory, which may include a flash disk, an ROM, an RAM, a magnetic disk, or an optical disk.

What is claimed is:

1. A method for processing a measurement gap, applied to a user equipment (UE) and comprising:

receiving, by the UE, a gap parameter configured by a network device, performing measurement by using a gap; and receiving, by the UE, first control signaling, reserving a gap configuration, and suspending the gap, wherein the first control signaling indicates secondary cell group (SCG) deactivation or secondary cell (SCell) deactivation to the UE;

in response to the UE being configured with a dual connectivity (DC) and determining, by the UE, SCG deactivation according to the first control signaling, suspending, by the UE, the measurement gap based on a determination that a radio frequency (RF) transceiver serving a SCG is different from an RF transceiver serving a master cell group (MCG), or, suspending, by the UE, the measurement gap based on a determination that the UE indicates that the gap is not required for the measurement in a NeedForGAP message reported when the SCG is not configured; and in response to the UE being configured with a carrier aggregation (CA) and determining, by the UE, SCell deactivation according to the first control signaling, suspending, by the UE, the measurement gap based on a determination that an RF transceiver serving a deactivated SCell is different from an RF transceiver serving other cells, or, suspending, by the UE, the measurement gap based on a determination that the UE indicates that the gap is not required for the measurement in a NeedForGAP message reported when the deactivated SCell is not configured.

2. The method of claim 1, further comprising:

adjusting, by the UE, frequencies to be measured according to the first control signaling.

3. The method of claim 2, wherein adjusting, by the UE, the frequencies to be measured according to the first control signaling comprises:

stopping, by the UE, measuring measurement frequencies configured by a secondary base station, during SCG deactivation.

4. The method of claim 2, wherein adjusting, by the UE, the frequencies to be measured according to the first control signaling comprises:

continuing, by the UE, measuring part of measurement frequencies configured by a secondary base station, during SCG deactivation.

5. The method of claim 2, wherein adjusting, by the UE, the frequencies to be measured according to the first control signaling comprises:

continuing, by the UE, measuring all measurement frequencies configured by a secondary base station, during SCG deactivation.

6. The method of claim 1, further comprising:

receiving, by the UE, second control signaling, and starting, according to the gap parameter, the gap, and performing measurement, wherein the second control signaling indicates SCG activation to the UE.

7. The method of claim 6, wherein the second control signaling is a MAC CE or layer 1 signaling.

8. The method of claim 1, wherein the first control signaling is a medium access control (MAC) control element (CE) or layer 1 signaling.

9. An electronic device, comprising a processor, a memory, a communication interface, and one or more programs stored in the memory and configured to be executed by the processor, the programs comprising instructions for executing:

receiving, by a user equipment (UE), a gap parameter configured by a network device, performing measurement by using a gap;

receiving, by the UE, first control signaling, reserving a gap configuration, and suspending the gap, wherein the first control signaling indicates secondary cell group (SCG) deactivation or secondary cell (SCell) deactivation to the UE; and implementing at least one of:

in response to the UE being configured with a dual connectivity (DC) and determining, by the UE, SCG deactivation according to the first control signaling, suspending, by the UE, the measurement gap based on a determination that a radio frequency (RF) transceiver serving a SCG is different from an RF transceiver serving a master cell group (MCG), or suspending, by the UE, the measurement gap based on a determination that the UE indicates that the gap is not required for the measurement in a NeedForGAP message reported when the SCG is not configured; and in response to the UE being configured with a carrier aggregation (CA) and determining, by the UE, SCell deactivation according to the first control signaling, suspending, by the UE, the measurement gap based on a determination that an RF transceiver serving a deactivated SCell is different from an RF transceiver serving other cells, or, suspending, by the UE, the measurement gap based on a determination that the UE indicates that the gap is not required for the measurement in a NeedForGAP message reported when the deactivated SCell is not configured.

10. The electronic device of claim 9, further comprising:

adjusting, by the UE, frequencies to be measured according to the first control signaling.

11. The electronic device of claim 10, wherein adjusting, by the UE, the frequencies to be measured according to the first control signaling comprises:

stopping, by the UE, measuring measurement frequencies configured by a secondary base station, during SCG deactivation;

continuing, by the UE, measuring part of measurement frequencies configured by the secondary base station, during SCG deactivation; or continuing, by the UE, measuring all measurement frequencies configured by the secondary base station, during SCG deactivation.

12. The electronic device of claim 9, further comprising:

receiving, by the UE, second control signaling, and starting, according to the gap parameter, the gap, and performing measurement, wherein the second control signaling indicates SCG activation to the UE.

13. The electronic device of claim 12, wherein the first control signaling is a medium access control (MAC) control element (CE) or layer 1 signaling, and the second control signaling is a MAC CE or layer 1 signaling.

14. A non-transitory computer-readable storage medium, the computer-readable storage medium storing computer programs, when the computer program runs on a user equipment, the computer program implementing:

receiving, by the UE, a gap parameter configured by a network device, performing measurement by using a gap; and receiving, by the UE, first control signaling, reserving a gap configuration, and suspending the gap, wherein the first control signaling indicates secondary cell group (SCG) deactivation or secondary cell (SCell) deactivation to the UE; and implementing at least one of:

in response to the UE being configured with a dual connectivity (DC) and determining, by the UE, SCG deactivation according to the first control signaling, suspending, by the UE, the measurement gap based on a determination that a radio frequency (RF) transceiver serving a SCG is different from an RF transceiver serving a master cell group (MCG), or suspending, by the UE, the measurement gap based on a determination that the UE indicates that the gap is not required for the measurement in a NeedForGAP message reported when the SCG is not configured; and in response to the UE being configured with a carrier aggregation (CA) and determining, by the UE, SCell deactivation according to the first control signaling, suspending, by the UE, the measurement gap based on a determination that an RF transceiver serving a deactivated SCell is different from an RF transceiver serving other cells, or, suspending, by the UE, the measurement gap based on a determination that the UE indicates that the gap is not required for the measurement in a NeedForGAP message reported when the deactivated SCell is not configured.

* * * * *